United States Patent [19]

Sarten

[11] Patent Number: 4,757,755
[45] Date of Patent: Jul. 19, 1988

[54] MOBILE COOKING APPARATUS

[75] Inventor: Steven O. Sarten, Clinton, Ky.

[73] Assignee: Crowd Pleasers, Inc., Clinton, Ky.

[21] Appl. No.: 12,562

[22] Filed: Feb. 9, 1987

[51] Int. Cl.⁴ .......................... A47J 37/07; F24C 1/16
[52] U.S. Cl. ........................................ 99/357; 99/339; 126/276; 108/44
[58] Field of Search .................. 99/357, 339, 340; 126/276, 25 R, 25 A; 108/44

[56] References Cited

U.S. PATENT DOCUMENTS

| | | | |
|---|---|---|---|
| 2,634,749 | 4/1953 | Cone | 99/339 X |
| 3,696,803 | 10/1972 | Holloway, Jr. | 126/276 |
| 3,861,288 | 1/1975 | Cluff, Sr. et al. | 99/357 |
| 3,991,739 | 11/1976 | Hoffman, Jr. | 126/276 X |
| 4,086,849 | 5/1978 | Simmons | 99/357 |
| 4,232,488 | 11/1980 | Hanley | 108/44 X |
| 4,350,140 | 9/1982 | Hamilton, Jr. | 126/276 |
| 4,392,419 | 7/1983 | Bonny | 99/339 |

FOREIGN PATENT DOCUMENTS 2415575 10/1975 Fed. Rep. of Germany ........ 99/339

Primary Examiner—James Kee Chi
Attorney, Agent, or Firm—Harrington A. Lackey

[57] ABSTRACT

A mobile cooking apparatus including a trailer vehicle having an elongated chassis with front and rear end walls, open sides, and a platform supporting one or more elongated cooking units and at least one cover member having foldable cover segments adapted to be moved downward over the chassis in a closed position to confine the cooking units within the chassis and moved upward to an open position in which the cooking units are exposed for cooking operations upon the chassis. The cover members are so constructed that a side cover segment clearly displays indicia, such as advertising material in either its open or closed position. Each cooking unit includes an elongated burner unit which is detachable mounted upon the chassis and which detachably supports a cooker member of any one of various types, such as a deep-fat fryer, boiler, broiler, solid griddle or an open grill.

14 Claims, 7 Drawing Sheets

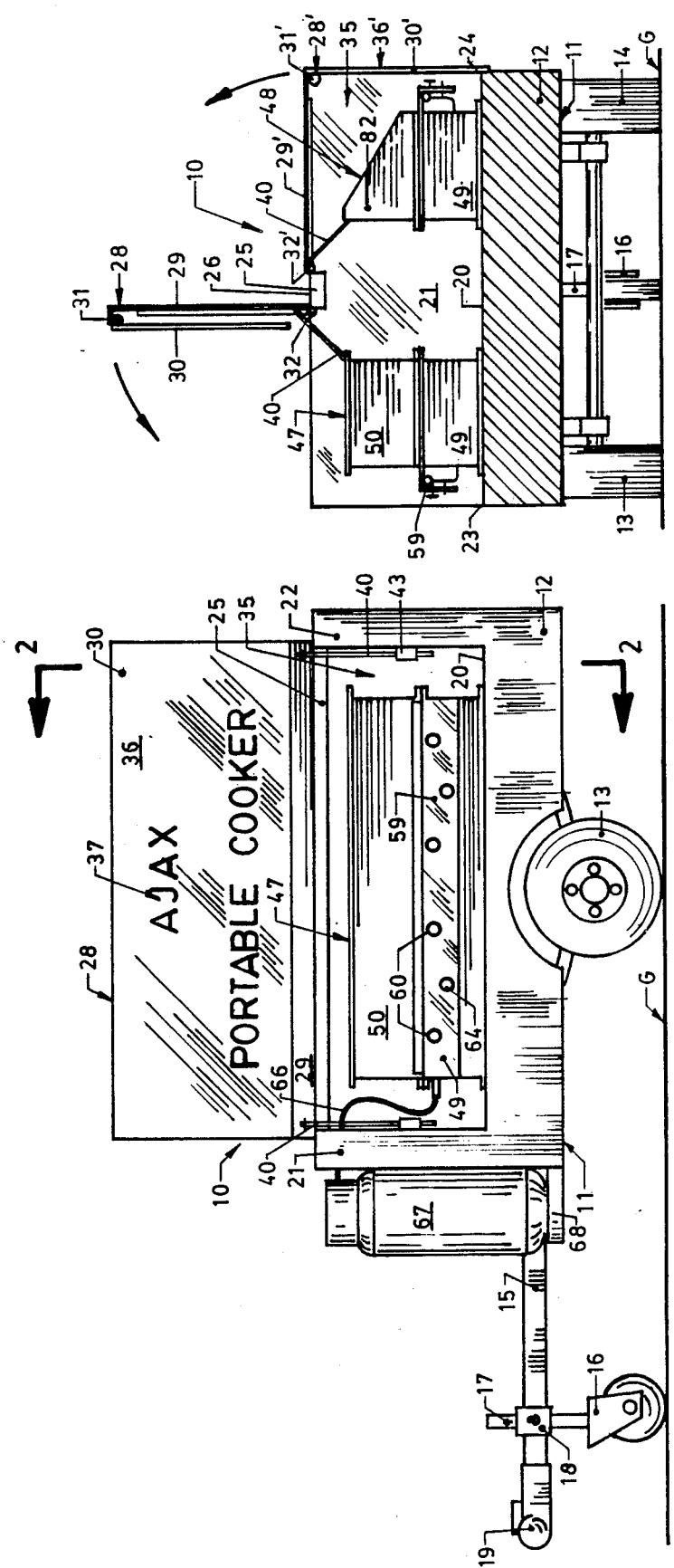

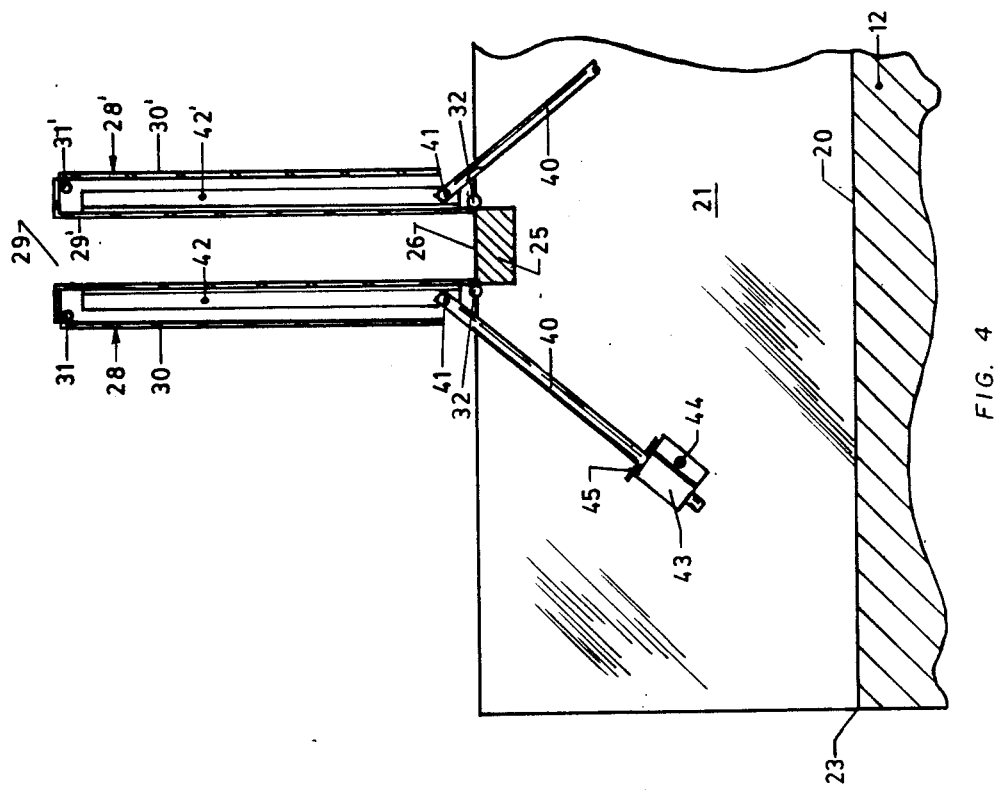
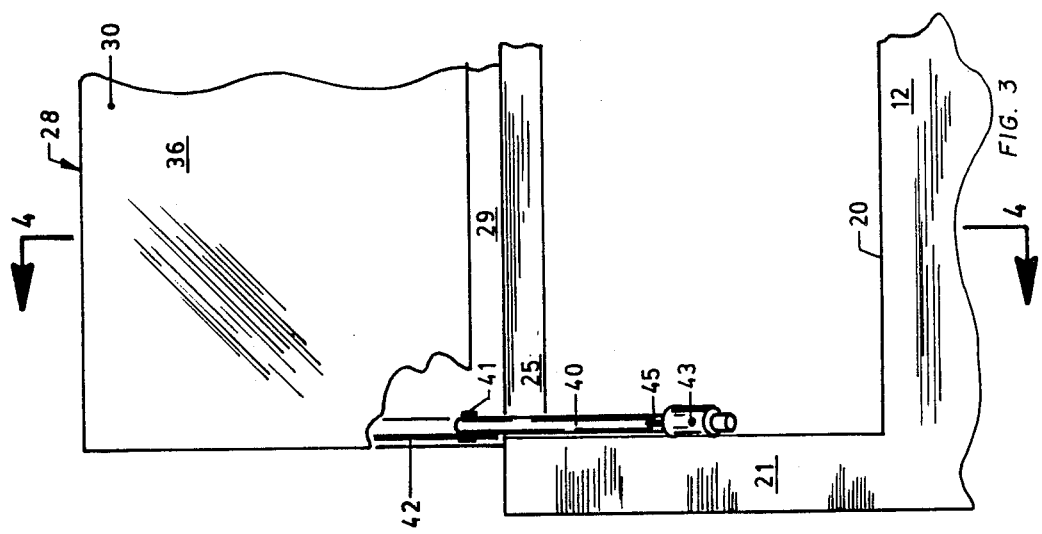

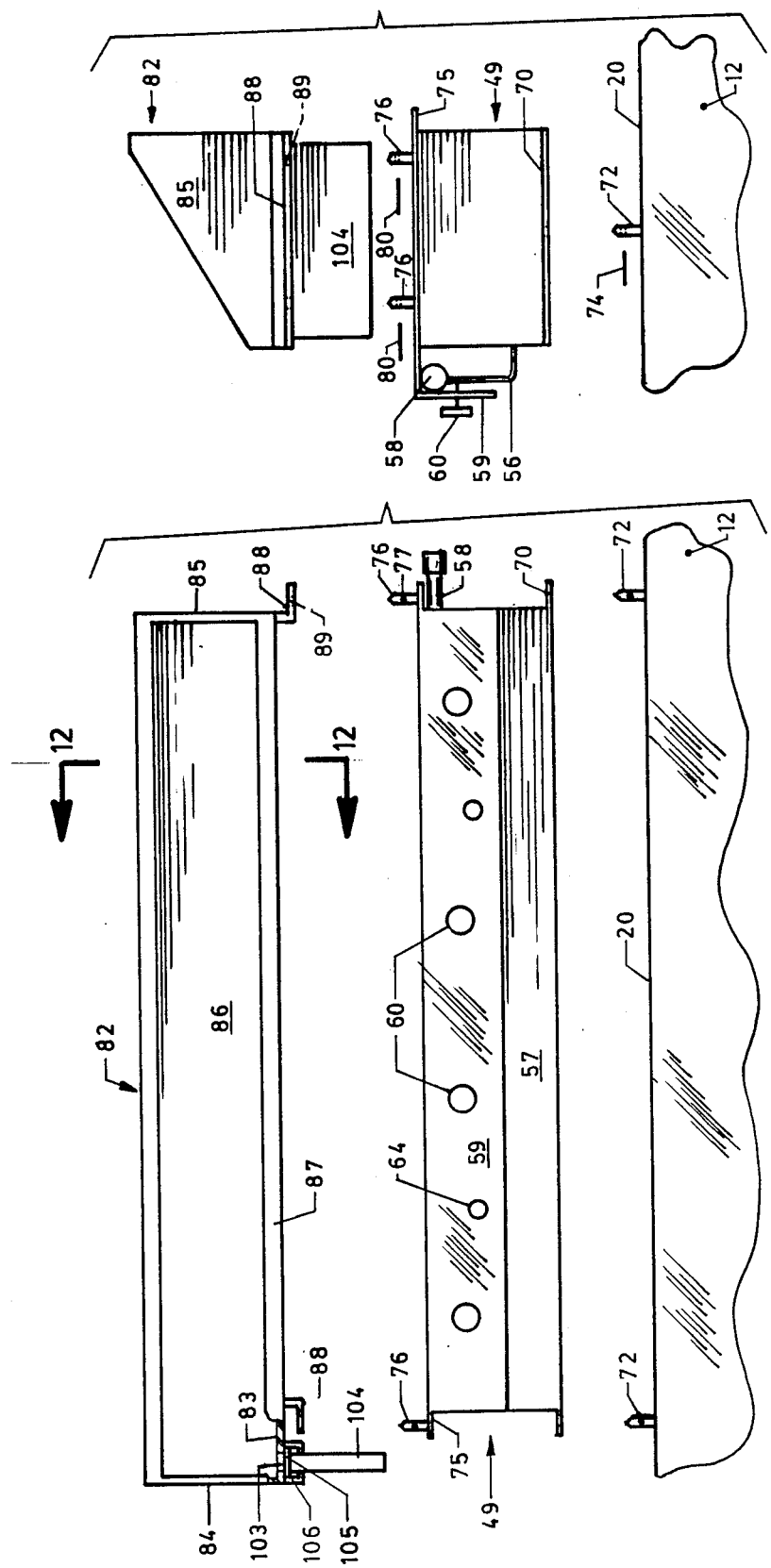

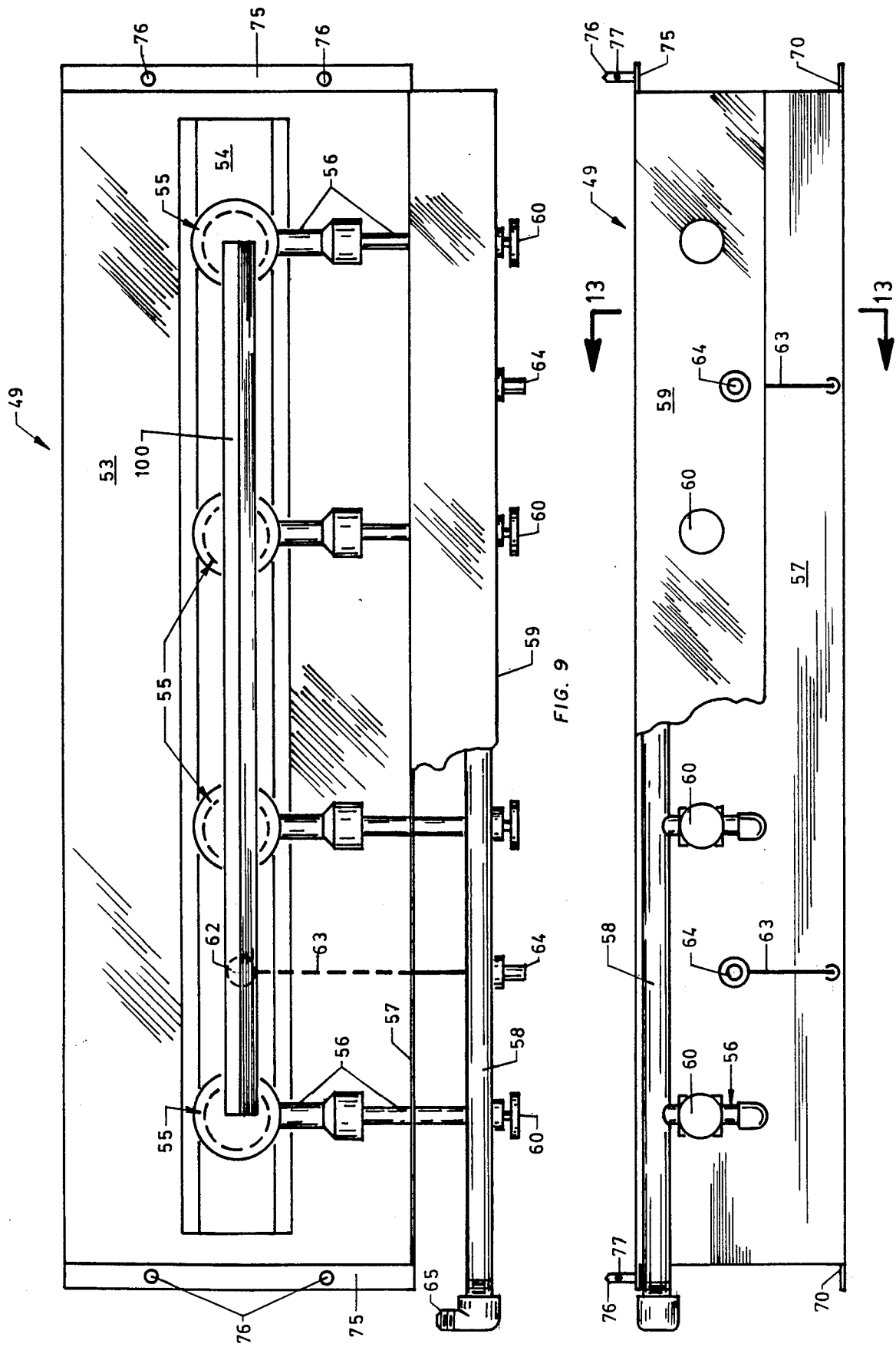

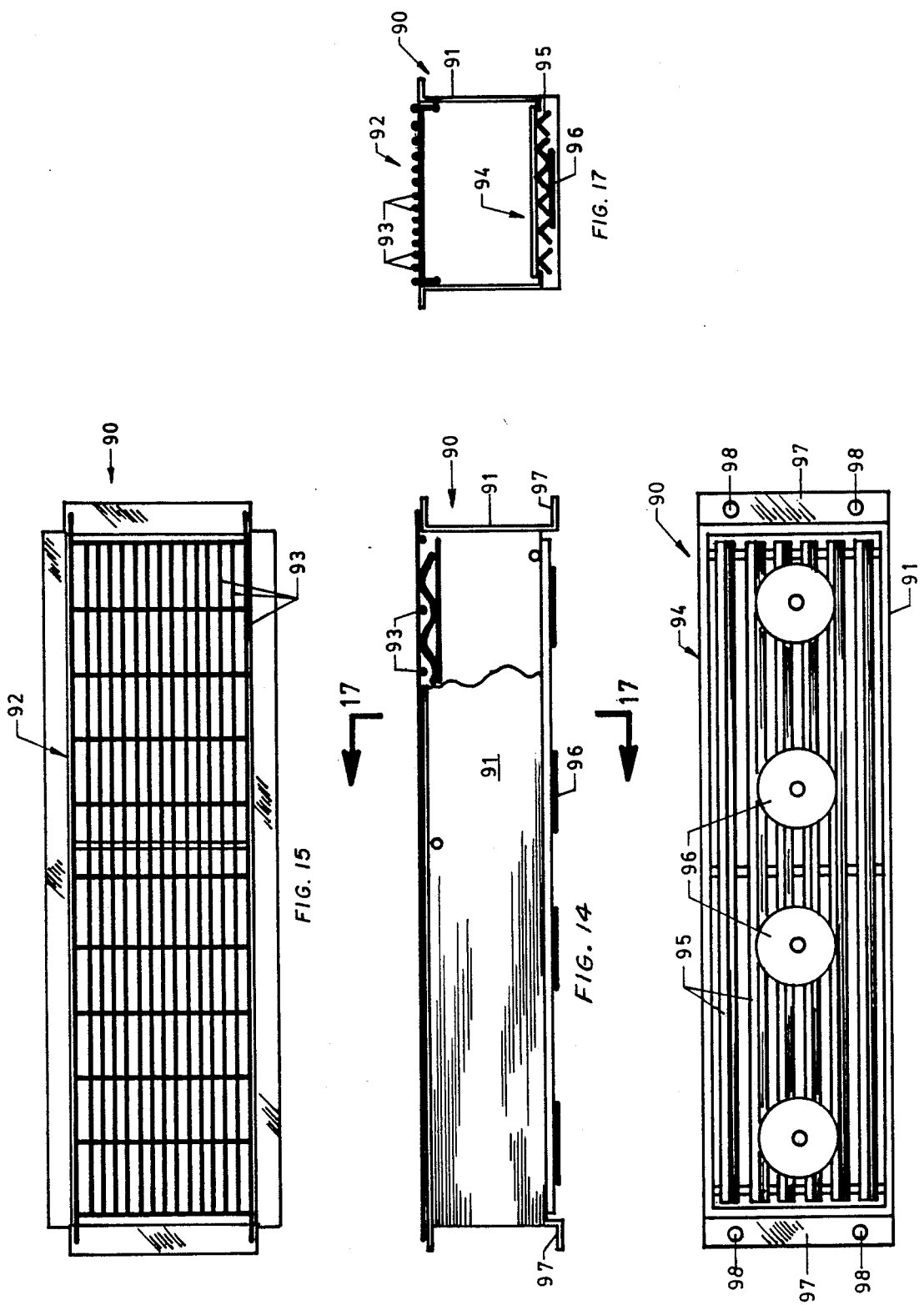

MOBILE COOKING APPARATUS

BACKGROUND OF THE INVENTION

This invention relates to a mobile cooking apparatus, and more particularly to a cooking apparatus detachably supported upon a trailer vehicle.

Heretofore, the cooking apparatus utilized for outdoor cooking for large groups of people for events, such as barbecues, fish frys, or other types of cooking operations, is usually transported to the cooking site by conventional types of conveyances, such as trucks or vans, unloaded and set up in a stationary position for the cooking operation. These cooking apparatus include gas burners, with portable gas bottles for supplying the gas to the burners and some type of appropriate cooker member mounted on top of the burners, such as a deep-fat fryer, griddle, or barbecue grill. After the cooking operation has been completed, the cooking apparatus is dismantled to whatever extent is provided by the particular manufacture of the cooking apparatus, loaded upon the truck and transported to its original storage site.

Mobile vendor stands or vans are also known in which the van is hauled to a desirable location and the products, such as hamburgers or hot dogs, are cooked and sold from the van.

Other types of mobile cooking apparatus are disclosed in the following U.S. patents: U.S. Pat. No. 4,108,055; Simmons; Aug. 22, 1978; U.S. Pat. No. 4,364,310; Rurfkahr; Dec. 21, 1982.

Both of the above U.S. patents disolose trailer vehicles in which the chassis itself forms the firebox and in which rotary cooking units are supported above the firebox for rotating the food as it is cooked.

Previously, the Applicant's have designed and marketed a mobile cooking apparatus including a chassis or body defining a chamber in which are located an elongated broiler unit upon which is supported a cooking vat, such as a deep-fat fryer. The combined cooking unit of the burner and the fryer are supported on a tray, which in turn is mounted upon tracks for pulling the tray and the cooking unit horizontally and laterally of the chassis and out upon a drop door which forms the side wall of the chassis in its inoperative position. The difficulty with this mobile apparatus design is that the cooking unit can only be utilized when it is pulled laterally outward to rest upon the drop door. When the cooking unit remains inside the chassis, the drop door forms a barrier to prevent the operator or cook to have access to the cooking unit. Moreover, when the cooking unit is within the chassis, which has a closed roof, there is no room above the cooking unit while it remains in the chassis for manipulating and observing the food, nor is there sufficient room for the escape of the cooking gases and the products of combustion.

SUMMARY OF THE INVENTION

It is therefore an object of this invention to provide a mobile cooking apparatus in the form of a trailer vehicle in which the chassis is particularly adapted for receiving a cooking apparatus which can be operated on the chassis, or can be removed from the chassis and operated independently of the chassis.

One object of this invention is to provide a mobile cooking apparatus including a trailer vehicle having an enclosed housing for one or more cooking units and in which the housing comprises a foldable cover member which will completely enclose and protect the burner unit when the cover member is closed and which can be raised and folded to an inoperative position completely exposing the side and top of the burner unit for access to and operation of the burner unit and for the unimpeded rise of cooking vapors and the gaseous products of combustion.

Another object of this invention is to provide a mobile cooking apparatus including a trailer vehicle chassis having a foldable cover member displaying indicia, such as advertising material, clearly visible to onlookers regardless of the position of the cover member.

Another object of this invention is to provide a mobile cooking apparatus including a trailer vehicle upon which a cooking unit is detachably mounted and which may be easily inserted and removed from the trailer vehicle.

A further object of this invention is to provide a mobile cooking apparatus including a trailer vehicle supporting a cooking unit which may be operated upon the trailer vehicle, or is removable for operation in another location, and in which the trailer vehicle as well as the cooking apparatus may be easily cleaned and maintained.

A further object of this invention is to provide a mobile cooking apparatus in which cooker members of various types, such as broilers, boilers, deep-fat fryers, griddles and grills, may be readily substituted and operated.

Another object of this invention is to provide a mobile cooking apparatus including a trailer vehicle and a cooking unit incorporating gas burners, and in which the entire cooking unit and the gas fuel assembly and supply containers are carried by the trailer vehicle, and in which a deflector bar is utilized to spread the flame to all the gas burners.

The mobile cooking apparatus made in accordance with this invention includes a trailer vehicle having a chassis or housing with opposed end walls, open sides, and a foldable cover including a top cover segment and a side cover segment adapted to entirely enclose the cooking unit within the chassis of the trailer vehicle in a closed position and to be raised to an open position in which the cooking unit is entirely uncovered and ready for operation upon the trailer vehicle. The cooking unit includes an elongated burner housing including gas burners, supply conduits and an ignitor device, and one of a number of interchangable types of cooker members, such as a deep-fat fryer, a boiler, broiler, griddle or grill.

BRIEF DESCRIPTION OF THE DRAWINGS

FIG. 1 is a side elevation of the apparatus made in accordance with this invention, with the cover member in a raised, open position;

FIG. 2 is a section taken along the line 2—2 of FIG. 1, with one of the two cover members in a closed position and the other cover member in an elevated, open position, and disclosing two cooking units, each including a different type cooker member;

FIG. 3 is an enlarged, fragmentary side elevational view of the front end portion of the trailer chassis, with the cooking units removed, with the cover member in an elevated, open position, and with a portion of the side cover segment broken away;

FIG. 4 is a fragmentary section taken along the line 4—4 of FIG. 3, with both cover members in their elevated, open positions;

FIG. 7 is an exploded side elevational view of a cooking unit similar to that disclosed in FIG. 5, but with the deep-fat fryer container replaced by a griddle-type cooker member;

FIG. 8 is an exploded end elevational view of the apparatus disclosed in FIG. 7;

FIG. 9 is an enlarged fragmentary plan view of the burner housing, with portions broken away;

FIG. 10 is a side elevational view of the burner housing disclosed in FIG. 9, with portions broken away;

FIG. 14 is a side elevational view of a grill-type cooker member, with portions broken away;

FIG. 15 is a top plan view of the cooker member disclosed in FIG. 14;

FIG. 16 is a bottom plan view of the cooker member disclosed in FIG. 14; and

FIG. 17 is a sectional elevation taken along the line 17—17 of FIG. 14.

DESCRIPTION OF THE PREFERRED EMBODIMENTS

Figure 6:
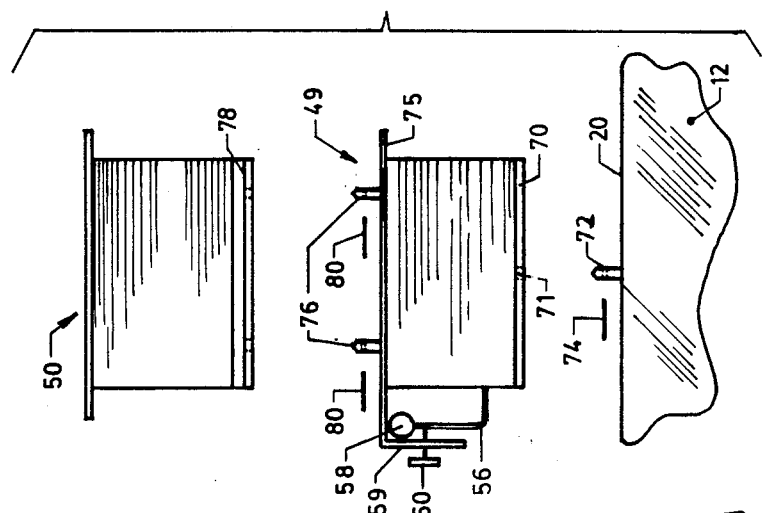
FIG. 6 is an exploded fragmentary end elevational view of the apparatus disclosed in FIG. 5.

Referring now to the drawings in more detail, FIGS. 1 and 2 disclose the mobile cooking apparatus 10 made in accordance with this invention, including a trailer vehicle 11 having an elongated chassis or housing 12 supported upon the ground G by wheels 13 and 14, and adapted to be towed by a prime mover, such as an automobile or truck, not shown by means of the tongue 15. Mounted upon the tongue 15 is a dolly 16 including a vertical stem 17 adjustably mounted within a bracket 18 fixed to the tongue 15, as best disclosed in FIG. 1.

The front end of the tongue 15 is provided with a trailer hitch member 19 for attachment to a cooperating trailer hitch member, not shown, mounted on the rear of a prime mover.

The chassis 12 includes an elongated platform 20 terminating in the upright front end wall 21 and the rear end wall 22. The platform 20 extends laterally to the sides of the chassis 12 and terminates in the corresponding left and right elongated side edges 23 and 24, to provide large lateral or side openings extending entirely transversely through the chassis 12 between the end walls 21 and 22. The platform 20 is planar or substantially flat, and extends transversely without interruption to its corresponding side edges 23 and 24. Moreover, the planar platform 20 is normally horizontal when the chassis 12 has been properly leveled by the adjustment of the dolly 16 relative to its bracket 18.

Preferably, the end walls 21 and 22 are of uniform height and extend transversely substantially straight, with interior vertical planar surfaces, the entire width of the chassis 12.

An elongated top frame member 25 extends from front to rear substantially the length of the chassis 12 and spaced above the platform 20 between the upper edge portions of the respective end walls 21 and 22. The top frame member 25 is preferably fixed at its ends, by any convenient means, not shown, to the upper portions of the end walls 21 and 22. The top surface 26 of the frame member 25 is preferably flush with the top surfaces of the corresponding end walls 21 and 22. As disclosed in FIG. 2, the top frame member 25 is disclosed as having a uniform, rectangular cross-section and is located centrally of the chassis 12, equally spaced between the opposite sides of the chassis.

As best disclosed in FIGS. 1-4, a left cover member 28 is constructed of a pair of hinged panels, including a rectangular top cover panel or segment 29 and a side cover panel or segment 30 connected longitudinally along their adjacent edges by an elongated hinge member 31. The inner or inboard edge portion of the top cover segment 29, that is the opposite edge of the top cover segment from its edge hinged to the side cover segment 30, is also connected by an elongated hinge member 32 to the left side portion of the top frame member 25. These hinge members 31 and 32 may be in the form of piano hinges.

A right cover member 28', as illustrated in FIGS. 2 and 4, is identical in construction to the cover member 28, except that the parts are mirror images of the parts of the left cover member 28, and accordingly, are indicated by identical primed reference numerals. The right cover member 28' is designed to cover the right side and top of the cooking chamber 35, while the left cover member 28 is adapted to cover the left side and top portion of the cooking chamber 35. Both members 28 and 28' in closed positions, and the front and rear end walls 21 and 22 and the platform 20 completely enclose the cooking chamber 35. In FIG. 2, the left cover member 28 is illustrated in its raised or elevated open position, while the right cover member 28' is illustrated in its closed position.

When the cover member 28' is in its closed position, as illustrated in FIG. 2, the top cover segment 29' extends substantially horizontally across the top of the cooking chamber 35 from the top frame member 25 to the right side of the chassis 12. Then the side cover segment 30' depends substantially vertically from the outboard side edge of the top cover segment 29' down to and slightly below the side edge 24 of the platform 20, in order to completely enclose the cooking chamber 35.

As illustrated in FIGS. 2, 3, and 4, the left cover member 28 is in its completely open position in which the top cover segment 29 projects vertically upward from the left edge of the top frame member 25, while the left side cover segment 30 projects substantially vertically downward, parallel to its corresponding top cover segment 29.

As illustrated in FIG. 1, the outer or outside surface 36 of the side cover segment 30 is adapted to receive indicia 37, such as an advertising message. Similar indicia can be applied to the outside surface of the side cover segment 30', as well as to the back surface of the rear end wall 22. It is therefore apparent from FIGS. 1-4, that the advertising indicia 37 on either or both the side cover segments 30 and 30' is always clearly visible to onlookers from the sides of the vehicle 11, regardless of the open or closed position of the cover members 28 and 28'.

In order to hold the cover member 28 in its elevated position, as illustrated in FIG. 1-4, the upper end portion of an elongated stop rod 40 is pivotally connected by pin 41 to the side flange 42 of the top cover segment 29, in a pivot position, preferably closely spaced to the hinge member 32. The stop rod 40 is slidably received within a sleeve member 43, which in turn is pivotally supported upon the inner surface of the front end wall 21 by a pivot pin 44. Thus, as the cover member 28 moves between its open and closed positions, the stop rod 40 slides longitudinally within the sleeve member 43 while the sleeve member 43 rocks or pivots upon its pivot pin 44. When the cover member 28 is in its elevated position, as disclosed in FIG. 4, a locking pin or cotter key 45 is extended through a corresponding opening in the stop rod 40 adjacent the sleeve member 43 to prevent downward movement of the stop rod 40, and thereby hold the cover member 28 in its elevated open position.

In a preferred form of the invention, a stop rod 40 and cooperating pivotal sleeve member 43 are connected to opposite ends of the top cover segment 40 and the respective end walls 21 and 22. Furthermore, the stop rods 40 and sleeve members 43 are also connected to the opposite ends of the cover member 28' and the respective end walls 21 and 22.

As illustrated in FIG. 2, the cooking chamber 35 preferably contains a pair of cooking units 47 and 48. Each cooking unit 47 and 48 extends almost the entire length of the cooking chamber 35, and each is mounted on opposite sides of the cooking chamber 35, where each is accessible to the respective opposite sides of the chassis 12.

Figure 11:
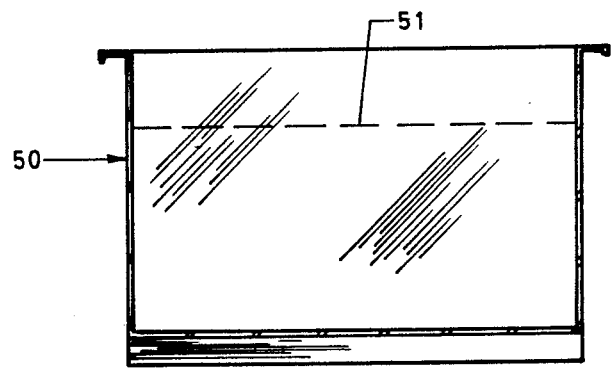
FIG. 11 is an enlarged sectional elevation taken along the line 11—11 of FIG. 5.

The cooking unit 47 basically includes a lower burner housing 49 and an upper cooker member, disclosed in the form of an elongated cooker container 50, such as a deep-fat fryer or a boiler. The cooker container 50 is illustrated as being rectangular, having an open top and adapted to receive a liquid, such as cooking oil for frying or water for boiling. The liquid may fill the container 50 to the level 51 illustrated in FIG. 11, if desired.

Figure 13:
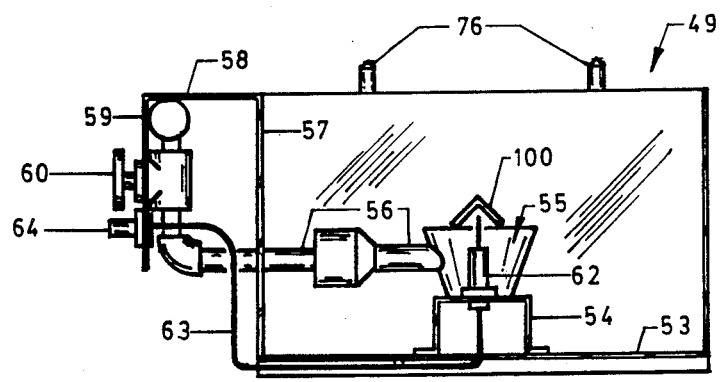
FIG. 13 is a sectional elevation taken along the line 13—13 of FIG. 10.

The burner housing 49, as best disclosed in FIGS. 9, 10, and 13, has a bottom wall 53 upon which is supported an elongated burner bracket 54, upon which is mounted a plurality of (4 shown in the drawings) longitudinally spaced gas burners 55 of conventional structure. Each burner 55 is provided with a gas inlet conduit 56, of conventional construction, extending through the front wall 57 of the burner housing 49 and terminating in elongated gas manifold conduit 58. The gas manifold conduit 58 is mounted along the front of the burner housing 49, and as illustrated in the drawings is supported behind the front control panel or shield 59. The supply of gas through each of the inlet conduits 66 is controlled by an individual valve manually regulated by the control knob 60.

Spaced between at least one pair of burners 55 is a conventional electronic ignition device 62 connected by an electrical wire or lead 63 to the ignition starter button 64, supported on the front panel 59.

As best illustrated in FIG. 9, the left end of the manifold conduit 58 is provided with a threaded connector 65, which may be detachably connected to a cooperating connector on the end of a flexible gas supply line 66, which in turn extends through an opening, not shown, in the front end wall 21. The other end of the gas supply line 66 is connected to a gas bottle 67 or other gas supply container. The gas bottle 67 is mounted upon a supporting platform 68 projecting forward from the chassis 12, if desired. (FIG. 1)

Figure 5:
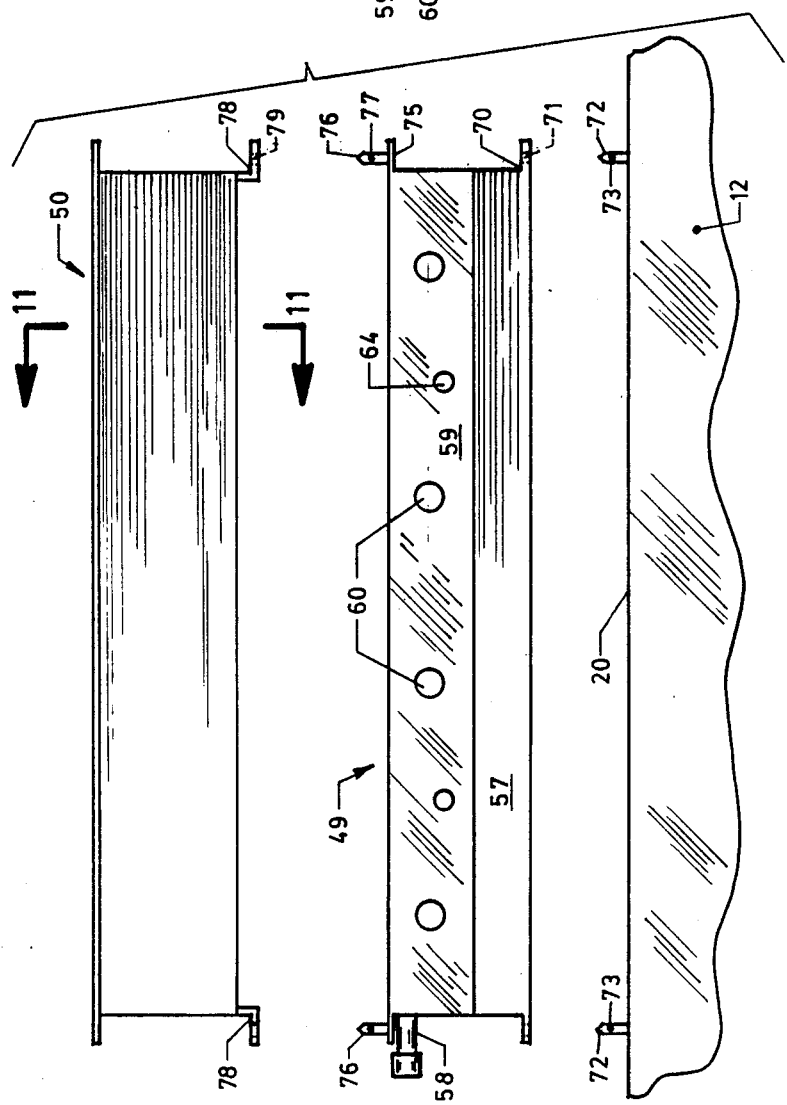
FIG. 5 is an exploded fragmentary side elevational view of the cooking unit including a burner housing and a deep-fat fryer container.

A pair of flanges 70, extend in opposite directions, forwardly and rearwardly, from the bottom ends of each burner housing 49 and are adapted to seat flush upon the top surface of the platform 20. Each flange 70 is provided with one or more apertures 71 which are adapted to receive, and also adapted to register with, corresponding positioning studs 72 projecting upward from the surface of the platform 20, as illustrated in FIGS. 5 and 6. Each of the studs 72 is provided with a transverse pin hole 73 adapted to receive a cotter key or locking pin 74. Thus, each burner housing 49 may be detachably secured in an operative position upon the platform 20 by the positioning studs 72 and the locking pins 74, and just as easily removed from the cooking chamber 35 by removing the locking pins 74, raising the burner housing 49 until the flanges 70 clear the studs 72, and moving the burner housing 49 laterally outward from the chassis 12.

Also projecting from the top ends of the burner housing 49 are a pair of flanges 75 provided with upward projecting positioning studs 76, as illustrated in FIGS. 5, 6, 9 and 10. Each upward projecting stud 76 is provided with a transverse pin hole 77 in the same manner as each stud 72 is provided with a pin hole 73.

The liquid cooker container 50 is an elongated or rectangular parallelepiped and is provided with forward and rearward projecting bottom end flanges 78 having apertures 79 of substantially the same diameter and registering with the positioning studs 76 on the burner housings 49. Thus, each cooker container 50 is adapted to be secured to the top of a corresponding burner housing 49 by seating its bottom flanges 78 upon the burner housing top flanges 75 so that the studs 76 extend upward through the corresponding apertures 79. The respective burner housing 49 and cooker container 50 are then locked in their stacked relationship by inserting cotter keys or locking pins 80 through the corresponding pin holes 77 of the studs 76. The cooker container 50 may just as easily be separated and removed from the burner housing 49 by removing the locking pins 80, lifting the container 50 and transversely moving the container 50 away from the burner housing 49.

The only difference between the cooking unit 48 and the cooking unit 47 is that in the cooking unit 48, a cooker member in the form of a griddle member 82 is substituted for the cooker container 50. The structure of the griddle member 82 is best disclosed in FIGS. 7, 8, and 12. Each griddle member 82 is in the form of a substantially planar, preferably horizontal, elongated griddle plate 83 surrounded by a pair of opposite end walls 84 and 85, a back wall 86, and a front lip 87. The bottom of the griddle member 82 is provided with forwardly and rearwardly extending bottom foot flanges 88 provided with apertures 89 adapted to register with the upward projecting studs 76 on the burner housing 49. Thus, the griddle member 82 is securely supported on the top of the burner housing 49 in the same manner as a cooker container 50. After the griddle member 82 is seated upon the top of the burner housing 49, the cotter pins or keys 80 are inserted into the corresponding pin holes 77 of the studs 76 to lock the griddle member 82 upon the burner housing 49.

A cooker member in the form of a broiler or grill member 90 is illustrated in FIGS. 14-17, and may be substituted for either the cooker container 50, or the griddle member 82 upon the same burner housing 49. The broiler or grill member 90 has a box-shaped housing 91 supporting on top an open grill 92 incorporating a plurality of grill bars 93 spaced perpendicular to each other. The bottom of the housing 91 supports a deflector member 94 having a plurality of transversely spaced, longitudinally extending, inverted V-shaped deflector bars 93, and a plurality of spaced, disc-shaped deflector plates 96 adapted to be located directly over each of the corresponding gas burners 55 when the broiler 90 is mounted upon the burner housing 49. The broiler 90 is provided with forward and rearward extending bottom end foot flanges 97 having apertures 98 adapted to receive the same vertical studs 76 projecting upward from the opposite ends of the burner housing 49.

It is conceivable that other types of cooker members could be substituted for the three described and disclosed above, that is the cooker container 50, the griddle member 82, and the broiler 90.

With reference to FIGS. 9 and 13, an elongated deflector bar 100 extends longitudinally over, and is supported by, the gas burners 55. The deflector bar 100 has an inverted trough-shaped cross-section, as illustrated in FIG. 13. In the particular construction disclosed in FIG. 9, the deflector bar 100 is made of an elongated angle bar or piece of angle iron or steel. The deflector bar 100 extends directly above not only the burners 55, but also the ignition devices 62. Thus, when it is desired to ignite the burners 55, the control valves 60 are opened to permit gas to enter the burners 55, and then one or more of the ignition push buttons 64 is depressed to actuate the electronic ignition devices 62 to produce a flame beneath the deflector bar 100. The flame is spread or distributed longitudinally of the deflector bar 100 by its inverted trough-shaped contour and then automatically ignites the gas in the burners 55.

In the grill member 92 when secured to the top of the burner housing 49, the deflector bars 95 and the deflector discs 96 perform a similar function to the deflector bar 100, that is they spread flames more uniformly to greater areas of the grill member 92 in order to provide a more uniform cooking of the food products supported upon the grill member 92.

Figure 12:
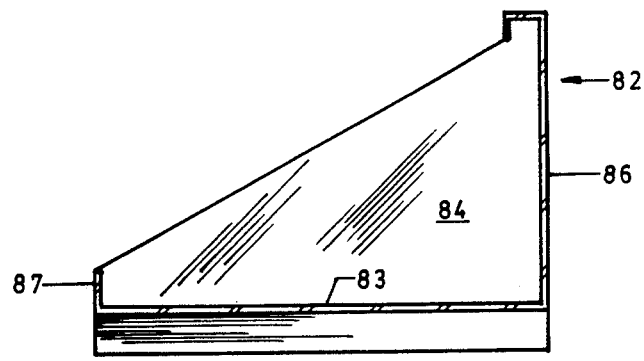
FIG. 12 is an enlarged sectional elevation taken along the line 12—12 of FIG. 7.

If desired, an elongated grease opening 103 may be formed transversely at one end, such as the left end, of the griddle 82 disclosed in FIG. 7, for the draining of excess grease from the griddle plate 83. Grease draining through the opening 103 will fall into a grease receptacle 104 having guide flanges 105 at the top thereof for slidably engaging a transverse guide track 106 (FIG. 7). Accordingly, the grease receptacle 104 may be easily removed and inserted in its position for receiving grease from the grease drain opening 103, when desired. In FIG. 12, the grease receptacle 104 has been removed from the griddle 82.

In the operation of the apparatus 10, one or more burner housings 49 are installed upon the chassis 20 by the studs 72 and locking pins 74, previously described, to affix the burner housings 49 within the cooking chamber 35. A desired cooker member 50, 82, or 90 is then seated upon the top of the corresponding burner housing 49 and locked in place by the respective studs 76 and locking pins 80. After the desired cooking units 47, 48, or other cooking units, are installed and locked in place upon the chassis 20, the cover members 28 and 28' are then unfolded and lowered to their closed position, such as the closed position of the cover member 28' disclosed in FIG. 2. The lowering of the cover members 28 and 28' is effectuated, of course, after the locking pins 45 have been removed from the stop rods 40. With the cover members 28 and 28' in their closed positions, the trailer hitch member 19 is then connected to its mating hitch member upon the rear of a prime mover, not shown, and the cooking apparatus 10 is then transported to the desired destination for the cooking operation.

After the destination is reached, the prime mover may be disconnected from the apparatus 10, if desired, and the platform 20 may then be leveled by making the appropriate adjustments between the dolly stem 17 and the cooperating bracket 18. The cover members 28 and 28' may then be raised to their folded open positions, as disclosed in FIG. 4, and the locking pins 45 inserted. If the cooking is to be carried out in the respective cooking units 47 and 48 while they are mounted on the platform 20, then it is only necessary to connect the gas lines 66 to the connectors 65, insert the desired cooking liquid within the cooker container 50, if the liquids are not already in the containers. If deep-fat frying is desired, then cooking oil will be poured into the cooker container 50. On the other hand, if the food is to be boiled or broiled, then water will be introduced into the container 50. The gas control knobs 60 are then turned, and one or more of the ignition buttons 64 depressed to start the fire within the burners 55. Flames are spread by the deflector bar 100 to all of the burners 55 and the cooking commences.

Because the platform surface 20 is planar and the interior surfaces of the walls 21 and 22 are smooth and planar, all of which surfaces are preferably made of stainless steel, the interior of the chassis 12 is easily cleaned and maintained. Moreover, the bottom surfaces of the end flanges 70 are smooth and planar so that they may slide easily over the platform surface 20 in areas where the slidable movement is not obstructed by the upward projecting studs 72. The smooth interior planar surfaces of the cover segments 29, 30, 29' and 30' are also easily cleaned.

If desired, when the apparatus 10 has been towed to the desired cooking destination, then cooking units 47 and/or 48 may be removed from the cooking chamber 35 and placed upon the ground, or within a building, if the cooking operation is desired to be conducted in those sites.

In view of the continual vertical attitude of the side cover segments 30 and 30', any advertising indicia 37 may be placed upon the outer surfaces 36 and always fully exposed to view laterally of the apparatus 10, regardless of whether the cover member 28 is in an open or closed position.

What is claimed is:

1. A mobile cooking apparatus, comprising:
   (a) a trailer vehicle comprising an elongated chassis having front and rear end portions, and gound-engaging wheels supporting said chassis,
   (b) said chassis comprising an elongated platform having transversely spaced one side edge and an opposite side edge, and longitudinally spaced front and rear end walls projecting upward from said platform,
   (c) an elongated top frame member extending between said end walls and spaced above said platform and spaced substantially inboard from said one side edge, to define a cooking chamber between said end walls and said platform and below said top frame member and having a top opening between said top frame member and said one side edge and a side opening along said one side edge between said end walls,
   (d) an elongated cooking unit,
   (e) means detachably mounting said cooking unit in a cooking position on said platform within said cooking chamber directly below said top opening to permit the free rise of cooking vapors from said cooking unit in said cooking position, (f) a cover member comprising a top cover segment having an inner edge portion and a side cover segment foldably connected to said top cover segment, (g) hinge means connecting said inner edge portion to said top frame member for swinging movement of said top cover segment about a longitudinal pivotal axis spaced inboard from said one side edge above said cooking chamber to permit said cover member to swing between a closed position in which said top cover segment extends transversely over said cooking chamber and said side cover segment extends vertically downward from said top cover segment along said one side of said chassis to said platform to enclose said cooking unit in said cooking position within said cooking chamber, and an open position in which said top cover segment projects upward from said top frame member and said side cover segment folds against said top cover segment above said top frame member and above and inwardly spaced from said cooking unit in said cooking position so that the free rise of cooking vapors from said cooking unit through said top opening is unobstructed.

2. The invention according to claim 1 in which said side cover segment has an outer surface adapted to receive indicia, said outer surface being disposed substantially vertically when said cover member is in said closed position and in said open position, to expose said indicia to view from said one side of said chassis.

3. The invention according to claim 1 in which said platform is planar between said end walls and said opposite side edges to provide a large opening on said one side of said chassis when said cover member is in said open position.

4. The invention according to claim 1 in which said cooking unit comprises a burner housing including burner means, said detachable mounting means comprising burner mounting means detachably mounting said burner housing to said platform, and a cooker member supported on said burner housing for receiving heat from said burner means.

5. The invention according to claim 4 further comprising cooker mounting means detachably connecting said cooker member on said burner housing above said burner means.

6. The invention according to claim 5 in which said cooker mounting means comprises a plurality of positioning studs projecting upward from said burner housing, apertures in said cooker member registering with said positioning studs when said cooker member is supported on said burner housing.

7. The invention according to claim 4 in which said burner mounting means comprises positioning studs projecting upward from said platform and apertures in said burner housing adapted to register with said positioning studs for receiving said positioning studs when said burner housing is supported on said platform in operative position.

8. The invention according to claim 4 in which said burner housing is elongated, said burner mounting means mounting said burner housing on said platform in said operative position to extend front to rear of said chassis between said end walls, said burner means comprising a plurality of gas burners supported in said burner housing and spaced longitudinally of said housing, means on said chassis supplying gas to said burners, an ignitor device mounted in said burner housing between at least one pair of adjacent burners, and means for controlling said ignitor device to produce a flame, an elongated deflector bar extending longitudinally over all of said burners and said ignitor device, said deflector member having a trough-shaped cross section directed downward to spread flames produced by said ignitor device to said burners for igniting gas emanating from said burners.

9. The invention according to claim 1 further comprising means supporting said cover member in said open position comprising an elongated rod having an upper end, means pivotally mounting said upper end of said rod to said top cover segment, sleeve means slidably receiving said rod, means pivotally connecting said sleeve means to at least one of said end walls for pivotal movement of said sleeve means in a vertical plane parallel to said corresponding end wall, securing means holding said rod in said sleeve means in a predetermined locking position for supporting said top cover segment and said side cover segment in substantially vertical open positions projecting upward from said chassis.

10. The invention according to claim 4 in which said cooker member comprises an elongated open-top cooking container for receiving liquid.

11. The invention according to claim 4 in which said cooker member comprises an elongated griddle member having an upper surface adapted to receive food to be cooked and a bottom surface exposed to the heat from said burners.

12. The invention according to claim 11 in which said griddle member is a planar, solid grill plate.

13. The invention according to claim 4 in which said cooker member is a grill member comprising a plurality of spaced grill bars providing openings between said grill bars for receiving the passage of hot gases from said burners.

14. The invention according to claim 13 in which said grill member further comprises a layer of flame deflector members spaced below said grill bars.

* * * * *